(12) United States Patent
Yamanouchi et al.

(10) Patent No.: US 11,724,598 B2
(45) Date of Patent: *Aug. 15, 2023

(54) OPERATION DEVICE FOR AUTONOMOUS VEHICLE

(71) Applicant: Toyota Jidosha Kabushiki Kaisha, Toyota (JP)

(72) Inventors: Yuchi Yamanouchi, Toyota (JP); Masaharu Kinoshita, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/887,661

(22) Filed: May 29, 2020

(65) Prior Publication Data
US 2020/0406922 A1 Dec. 31, 2020

(30) Foreign Application Priority Data
Jun. 28, 2019 (JP) ................... 2019-121409

(51) Int. Cl.
B60W 60/00 (2020.01)
B60K 37/06 (2006.01)
(Continued)

(52) U.S. Cl.
CPC .............. B60K 37/06 (2013.01); B60K 35/00 (2013.01); B60Q 1/507 (2022.05); B60Q 1/543 (2022.05); B60W 30/18009 (2013.01); B60W 50/10 (2013.01); B60W 50/14 (2013.01); B60W 60/005 (2020.02); B60W 60/0025 (2020.02);
(Continued)

(58) Field of Classification Search
None
See application file for complete search history.

(56) References Cited

U.S. PATENT DOCUMENTS 9,586,579 B1   3/2017   Laskowsky et al.
9,802,638 B1   10/2017  Stoffel et al.
(Continued)

FOREIGN PATENT DOCUMENTS

JP   S58-142726 U   9/1983
JP   2014-069599 A  4/2014
(Continued)

OTHER PUBLICATIONS

Tesla. Tesla Mobile App Walkthrough. YouTube, Mar. 8, 2016, https://www.youtube.com/watch?v=vIVFhT-Djnl. (Year: 2016).*
(Continued)

Primary Examiner — James J Lee
Assistant Examiner — Andrew Sang Kim
(74) Attorney, Agent, or Firm — Dinsmore & Shohl LLP

(57) ABSTRACT

An operation device for an autonomous vehicle includes a touch panel configured to display at least one of a start button and a deceleration button, and a notification button on the same screen. The autonomous vehicle is autonomously drivable. The start button is a button for starting driving of the autonomous vehicle in an autonomous drive mode. The deceleration button is a button for decelerating the autonomous vehicle during the autonomous drive mode. The notification button is a button for performing notification to an outside of the autonomous vehicle.

10 Claims, 11 Drawing Sheets

(51) Int. Cl.
  *B60Q 1/50*   (2006.01)
  *B60W 50/10*  (2012.01)
  *B60W 50/14*  (2020.01)
  *B60W 30/18*  (2012.01)
  *B60K 35/00*  (2006.01)

(52) U.S. Cl.
  CPC .... *B60W 60/0051* (2020.02); *B60W 60/0053* (2020.02); *B60K 2370/1434* (2019.05); *B60K 2370/1446* (2019.05); *B60K 2370/171* (2019.05); *B60K 2370/195* (2019.05); *B60K 2370/77* (2019.05); *B60W 2050/146* (2013.01)

(56) References Cited

U.S. PATENT DOCUMENTS

| | | | |
|---|---|---|---|
| 10,742,967 B2* | 8/2020 | Hoggarth | H04N 9/3147 |
| 2009/0198414 A1* | 8/2009 | Mohning | B62D 1/12 |
| | | | 701/41 |
| 2015/0073685 A1 | 3/2015 | Choi et al. | |
| 2016/0264021 A1 | 9/2016 | Gillett | |
| 2017/0057519 A1 | 3/2017 | Ungetheim et al. | |
| 2017/0123434 A1 | 5/2017 | Urano et al. | |
| 2017/0151958 A1 | 6/2017 | Sakuma | |
| 2017/0153032 A1 | 6/2017 | Ashgriz et al. | |
| 2017/0371334 A1* | 12/2017 | Nagy | B60W 50/14 |
| 2018/0038139 A1 | 2/2018 | Zindler | |
| 2018/0041753 A1 | 2/2018 | Hoggarth et al. | |
| 2018/0095608 A1 | 4/2018 | Jablonski | |
| 2018/0194280 A1 | 7/2018 | Shibata et al. | |
| 2018/0206391 A1* | 7/2018 | Shinkai | G05D 1/0212 |
| 2018/0208211 A1 | 7/2018 | Chiba | |
| 2018/0292829 A1 | 10/2018 | Li | |
| 2018/0356818 A1 | 12/2018 | Arai et al. | |
| 2018/0373343 A1 | 12/2018 | Hashimoto et al. | |
| 2018/0374002 A1 | 12/2018 | Li | |
| 2020/0393826 A1* | 12/2020 | Golgiri | B60W 30/18 |

FOREIGN PATENT DOCUMENTS

| | | |
|---|---|---|
| JP | 2015-232740 A | 12/2015 |
| JP | 2016-030457 A | 3/2016 |
| JP | 2017-024521 A | 2/2017 |
| JP | 2017-119508 A | 7/2017 |
| JP | 2018-000156 A | 1/2018 |
| JP | 2018-108764 A | 7/2018 |
| JP | 2019-006277 A | 1/2019 |
| JP | 2019-103422 A | 6/2019 |
| KR | 10-2007-0098440 A | 10/2007 |
| KR | 10-2015-0019353 A | 2/2015 |
| KR | 10-2015-0029056 A | 3/2015 |
| RU | 2669910 C2 | 10/2018 |

OTHER PUBLICATIONS

Burt. Volvo Trucks and Cars Can Now Alert Each Other to Potential Hazards. My Little Salesman, May 29, 2018, https://www.mylittlesalesman.com/news/volvo-trucks-and-cars-can-now-alert-each-other-to-potential-hazards. (Year: 2018).*

Office Action issued to U.S. Appl. No. 16/913,270 dated Jan. 24, 2022.

Samsung Global Newsroom, Get Things Done Faster with the Newly Enhanced Edge Screen, Feb. 15, 2016, Samsung Newsroom, Retrieved from https ://news.samsung .com/global/get-things-done-faster-with-the-newly-enhanced-edge-screen (Year: 2016).

Mark Guim, Oh snap! 3 other ways to arrange multiple windows in Windows 10, Aug. 21, 2015, Windows Central, Retrieved from https://www.windowscentral.

Final Office Action dated Jul. 26, 2022 to U.S. Appl. No. 16/913,270.

Corrected Notice of Allowability dated Nov. 16, 2022 to U.S. Appl. No. 16/913,270, filed Jun. 26, 2020.

Notice of Allowance dated Nov. 8, 2022 to U.S. Appl. No. 16/913,270, filed Jun. 26, 2020.

Office Action dated Dec. 14. 2022 to U.S. Appl. No. 17/874,665, filed Jul. 27, 2022.

Notice of Allowance dated Mar. 29, 2023, Issued to U.S. Appl. No. 16/913,270, filed Jun. 26, 2020.

Notice of Allowance dated Apr. 4, 2023, Issued to U.S. Appl. No. 17/874,665, filed Jul. 27, 2022.

* cited by examiner

OPERATION DEVICE FOR AUTONOMOUS VEHICLE

CROSS-REFERENCE TO RELATED APPLICATIONS

This application claims priority to Japanese Patent Application No. 2019-121409 filed on Jun. 28, 2019, which is incorporated herein by reference in its entirety including the specification, drawings, and abstract.

BACKGROUND

1. Technical Field

This specification relates to an operation device for an autonomous vehicle.

2. Description of Related Art

Autonomous vehicles capable of driving autonomously are known in the art. Autonomous driving means that a computer performs drive control including acceleration and deceleration control, brake control, and steering control without operation by an operator.

The autonomous vehicles are equipped with an operation device for the operator to input various commands. For example, Japanese Unexamined Patent Application Publication No. 2019-6277 (JP 2019-6277 A) discloses an autonomous vehicle provided with mechanical switches and an autonomous driving on and off switch. The mechanical switches are switches for operating equipment (an air conditioning system etc.) included in the autonomous vehicle and are provided near a dashboard. The autonomous driving on and off switch is a switch for turning on and off an autonomous drive mode and is provided on the side of the driver's seat. Japanese Unexamined Patent Application Publication No. 2017-24521 (JP 2017-24521 A) discloses an autonomous vehicle with a touch panel. In this autonomous vehicle, the drive mode is changed using the touch panel.

SUMMARY

An operation device provided in an autonomous vehicle can make it possible to perform an operation for vehicle speed control of the autonomous vehicle including start control, stop control, and acceleration and deceleration control and an operation for notifying the outside of the vehicle of the operation of blinkers, hazard lights, or a horn etc.

Both the operation for vehicle speed control and the operation for notifying the outside of the vehicle are performed frequently, or the operator may sometimes need to perform these operations quickly. It is therefore desirable that the operation device for performing these operations make it as easy as possible to switch between the operation for vehicle speed control and the operation for notifying the outside of the vehicle.

For example, in the case where one of a button for vehicle speed control and a button for notifying the outside of the vehicle is a soft button displayed on a touch panel, and the other is a mechanical hard button provided separately from the touch panel, it is sometimes not easy to switch between the operation for vehicle speed control and the operation for notifying the outside of the vehicle. Even when both the button for vehicle speed control and the button for notifying the outside of the vehicle are soft buttons, it is not easy to switch between the operation for vehicle speed control and the operation for notifying the outside of the vehicle in the case where the operator needs to perform a separate operation to switch the screen of the touch panel from one button to the other such as when the two buttons are not displayed at the same time.

An operation device for an autonomous vehicle disclosed in the specification makes it possible to easily switch between an operation for vehicle speed control and an operation for notifying the outside of the vehicle.

One aspect of the disclosure provides an operation device for an autonomous vehicle. The operation device for the autonomous vehicle according to this aspect includes a touch panel configured to display at least one of a start button and a deceleration button, and a notification button on the same screen. The autonomous vehicle is autonomously drivable. The start button is a button for starting driving of the autonomous vehicle in an autonomous drive mode. The deceleration button is a button for decelerating the autonomous vehicle during the autonomous drive mode. The notification button is a button for performing notification to an outside of the autonomous vehicle.

With the above configuration, both a vehicle speed control button (at least one of the start button and the deceleration button) and the notification button are soft buttons that are displayed on the touch panel, and the vehicle speed control button and the notification button are displayed on the same screen. Accordingly, an operator can operate both buttons quickly. That is, the operator can easily switch the operation between both buttons.

In the above aspect, the touch panel may stand upward from an upper surface of a base member on which an operator who operates the touch panel places an arm or a hand of the operator, and at least one of the start button, the deceleration button, and the notification button may be displayed on a lower part of the touch panel.

In the above aspect, at least one of the start button and the deceleration button may be displayed below the notification button.

In the above aspect, at least one of the start button and the deceleration button may be displayed in a center of a screen of the touch panel, and the notification button may be displayed near at least one of the start button and the deceleration button.

In the above aspect, at least one of the start button and the deceleration button may be displayed larger than the notification button.

In the above aspect, the autonomous vehicle may have a plurality of drive modes including the autonomous drive mode and a manual drive mode, and the touch panel may be configured to display a drive mode change button on the same screen, the drive mode change button being a button for changing the drive mode of the autonomous vehicle.

In the above aspect, the touch panel may be configured to display a state of the autonomous vehicle on the same screen.

In the above aspect, the autonomous vehicle may have a plurality of drive modes including the autonomous drive mode and a manual drive mode, the touch panel may be configured to display a shift change button on the same screen, the shift change button being a button for changing a shift of the autonomous vehicle, and a manner in which the shift change button is displayed may be changed according to the drive mode of the autonomous vehicle.

In the above aspect, the touch panel be configured to temporarily display on the same screen a message for an operator who operates the touch panel, and the message may be displayed superimposed on at least a part of a state indicator indicating a state of the autonomous vehicle.

In the above aspect, at least one of the start button and the deceleration button or the notification button may be operable with the message being displayed.

In the above aspect, the operation device for the autonomous vehicle may further include: a mechanical operation member configured to perform vehicle speed control of the autonomous vehicle, the mechanical operation member having a notification switch for performing the notification to the outside of the autonomous vehicle.

In the above aspect, the autonomous vehicle may have a plurality of drive modes including the autonomous drive mode and a manual drive mode, and the operation device for the autonomous vehicle may further include: an exterior light emitting member provided on the outside of the vehicle; and a processor configured to cause the exterior light emitting member to emit light in a color corresponding to the drive mode and configured to display a background of the touch panel in the same color as, or a similar color to, the light of the exterior light emitting member.

The operation device for the autonomous vehicle disclosed in the specification makes it easy to switch between the operation for vehicle speed control and the operation for notifying the outside of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
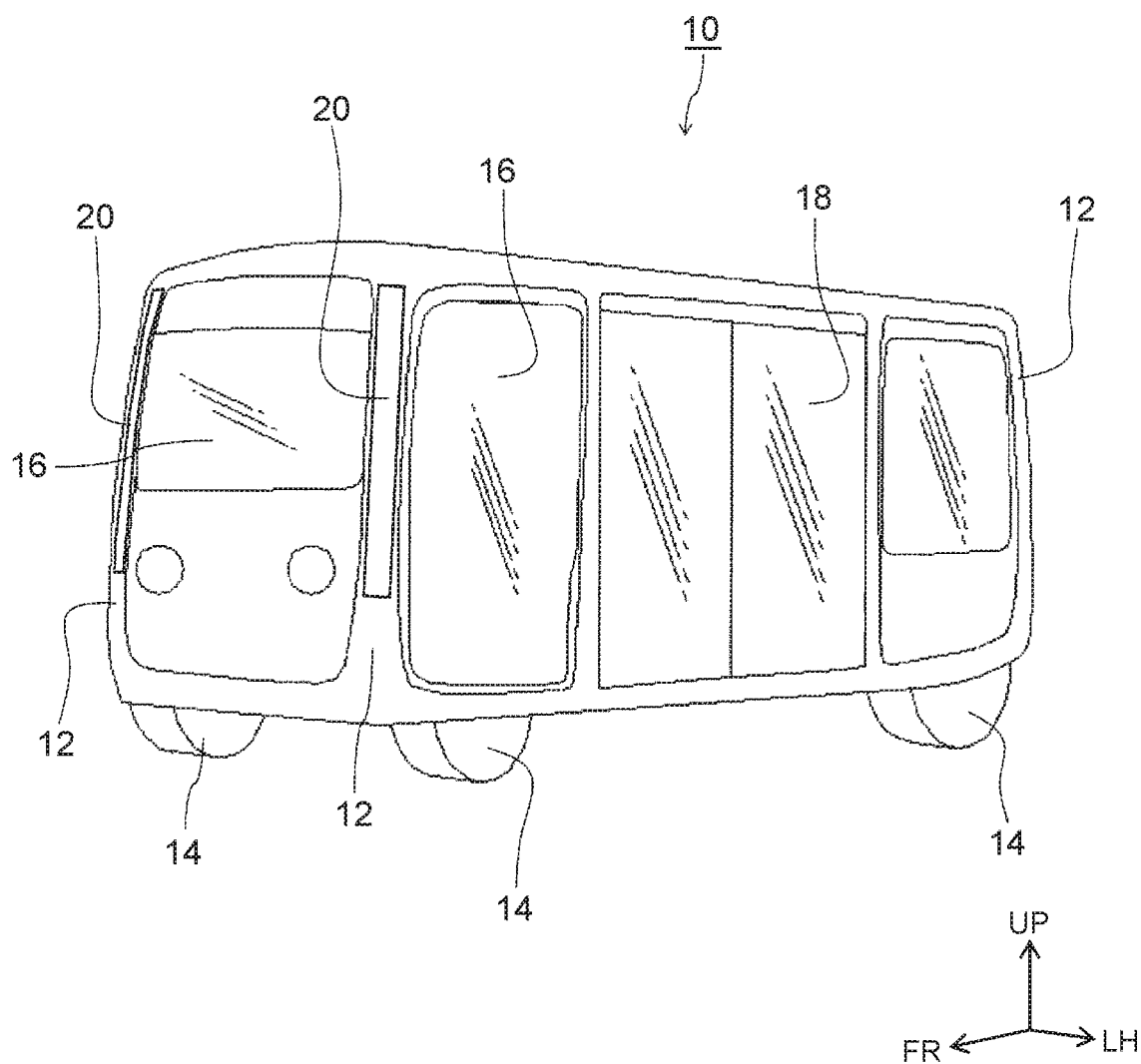
FIG. 1 is an external view of an autonomous vehicle according to an embodiment.

FIG. 1 is an external view of an autonomous vehicle 10 according to an embodiment. In the drawings of the specification, front (FR) and rear mean front and rear in the longitudinal direction of the vehicle, right and left (LH) mean right and left when facing forward, and upper (UP) and lower mean upper and lower in the vertical direction of the vehicle.

The autonomous vehicle 10 is generally in the shape of a rectangular parallelepiped. The autonomous vehicle 10 has a longitudinally symmetrical shape. The external design of the autonomous vehicle 10 is also longitudinally symmetrical. The autonomous vehicle 10 has vertically extending pillars 12 at four corners as viewed in plan and has wheels 14 below the pillars 12. Large parts of front, rear, right, and left side walls of the autonomous vehicle 10 are translucent panels 16. The panels 16 may be display panels, and characters etc. may be displayed on the panels 16.

A part of the panel 16 on the left side is a slidable door 18, and an occupant can get in and out of the autonomous vehicle 10 as the door 18 slides open. Although not shown in FIG. 1, a retractable ramp is accommodated below the door 18. The ramp is used for an occupant on a wheelchair to get in and out of the autonomous vehicle 10 etc.

The autonomous vehicle 10 is a vehicle capable of driving autonomously. Specifically, the autonomous vehicle 10 can drive in a plurality of drive modes including an autonomous drive mode, a semi-autonomous drive mode, and a manual drive mode.

The autonomous drive mode is a drive mode in which a computer (drive control unit (described later)) mounted on the autonomous vehicle 10 performs most of drive control. As used herein, the drive control is a concept including shift change control, vehicle speed control, steering control, and notification to the outside of the autonomous vehicle 10 (the outside of the vehicle). The vehicle speed control is a concept including start control, stop control, and acceleration and deceleration control of the autonomous vehicle 10. The notification to the outside of the vehicle includes, for, a blinker operation, a hazard light operation, a horn sound, etc.

The autonomous vehicle 10 can communicate with a management center that manages and controls a plurality of the autonomous vehicles 10. In the autonomous drive mode, the autonomous vehicle 10 is controlled by the management center to travel along a predetermined route. In the autonomous drive mode, the computer performs the drive control according to drive commands received from the management center. However, only the start control from the stopped state is performed by operation by an operator riding in the autonomous vehicle 10.

In the autonomous drive mode, the vehicle speed control and the notification to the outside of the vehicle can be performed not only by control from the management center but also by operation by the operator. In the present embodiment, the deceleration control of the vehicle speed control can be performed by operation by the operator during autonomous driving. The vehicle speed control other than the deceleration control may be able to be performed by operation by the operator. Of the notification to the outside of the vehicle, the blinkers and the hazard lights can be turned on and off and the horn can be honked by operation by the operator.

The semi-autonomous drive mode is a drive mode in which the computer mounted on the autonomous vehicle 10 performs most of the drive control of the autonomous vehicle 10 as in the autonomous drive mode. In the semi-autonomous drive mode, the computer performs the drive control based on detection results from various sensors (e.g., a camera and a LIDAR) mounted on the autonomous vehicle 10 rather than according to commands from the management center such that the autonomous vehicle 10 travels along a predetermined route. In the semi-autonomous drive mode as well, only the start control from the stopped state is performed by operation by the operator riding in the autonomous vehicle 10, and the vehicle speed control and the notification to the outside of the vehicle can also be performed by operation by the operator.

The manual drive mode is a mode in which the autonomous vehicle 10 does not drive autonomously but the operator riding in the autonomous vehicle 10 performs the drive control of the autonomous vehicle 10.

The autonomous vehicle 10 is provided with exterior light emitting units 20 at positions that are located on the outside of the vehicle and easily visible from outside the vehicle. In the present embodiment, the exterior light emitting units 20 are provided on the two front pillars 12. The light emitting state of the exterior light emitting units 20 changes according to the state of the autonomous vehicle 10. That is, the state of the autonomous vehicle 10 can be recognized from outside the vehicle by the exterior light emitting units 20. In the present embodiment, the exterior light emitting units 20 emit light in a color corresponding to the drive mode of the autonomous vehicle 10.

The autonomous vehicle 10 is a shared-ride vehicle in which a large unspecified number of occupants share the ride. In the present embodiment, the autonomous vehicle 10 is used as a bus that transports passengers while traveling along a prescribed route within a specific site. It is therefore assumed that the autonomous vehicle 10 repeatedly stops and starts moving relatively frequently. It is also assumed that the autonomous vehicle 10 travels at relatively low speeds (e.g., 30 km/h or less).

However, the form in which the autonomous vehicle 10 disclosed in the specification is used can be changed as appropriate. For example, the autonomous vehicle 10 may be used as a mobile business space or may be used as a retail store that displays and sells various products or a store such as a restaurant that prepares and serves food and drinks. Alternatively, the autonomous vehicle 10 may be used as an office for office work, meetings with customers, etc. The autonomous vehicle 10 is not only used for businesses, but may be used as, for example, personal transportation means. The traveling pattern and the traveling speed of the autonomous vehicle 10 may also be changed as appropriate.

The autonomous vehicle 10 is an electric vehicle having, as a prime mover, a drive motor that receives power supply from a battery. The battery is a rechargeable secondary battery and is periodically charged with external power. The autonomous vehicle 10 is not limited to the electric vehicle but may be other types of vehicles. For example, the autonomous vehicle 10 may be an engine vehicle equipped with an engine as a prime mover, or a hybrid vehicle equipped with an engine and a drive motor as prime movers. The autonomous vehicle 10 may be a hydrogen vehicle that drives a drive motor with electric power generated by a fuel cell.

Figure 2:
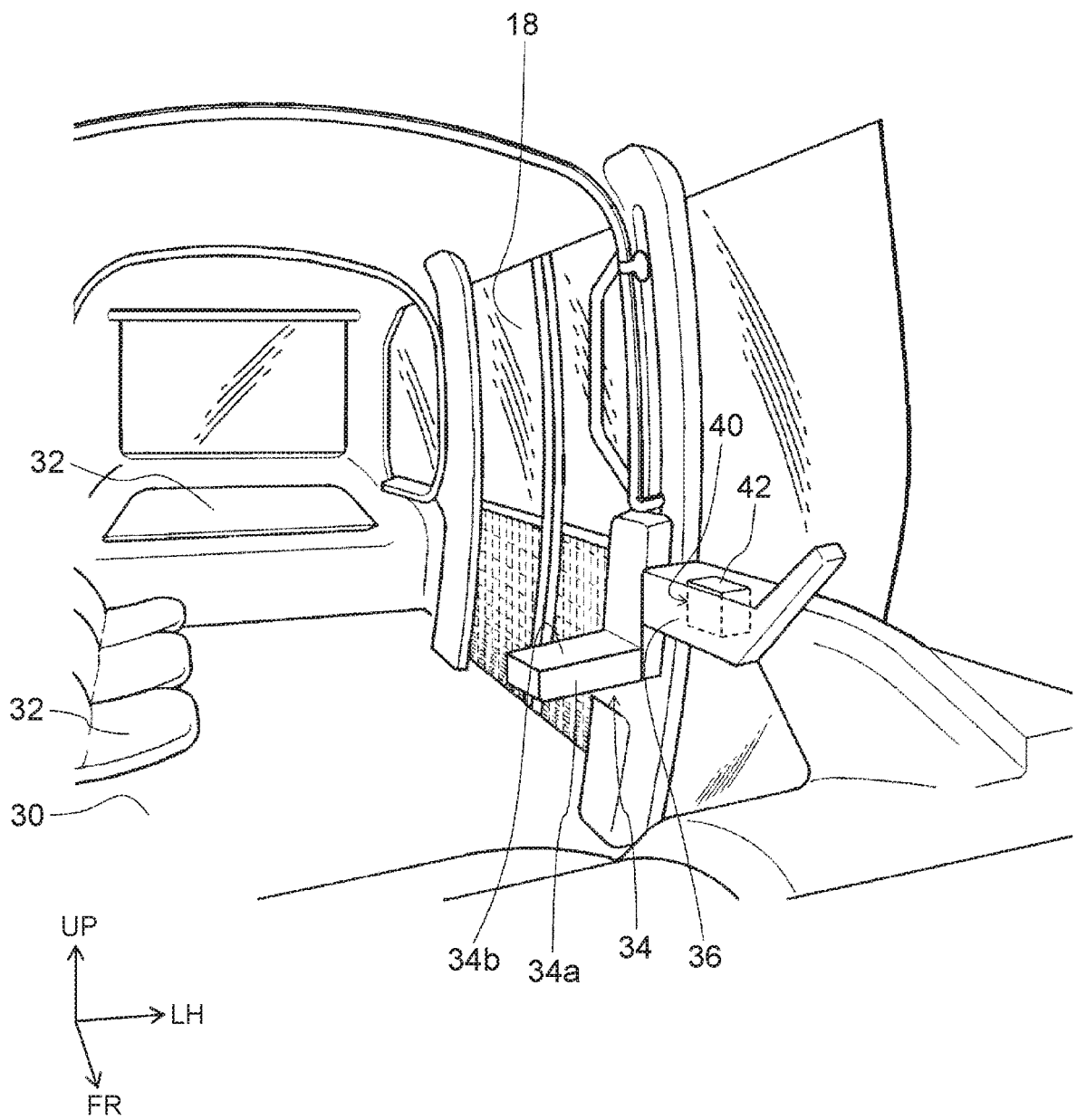
FIG. 2 is a first perspective view showing the inside of a passenger compartment of the autonomous vehicle according to the embodiment.
Figure 3:
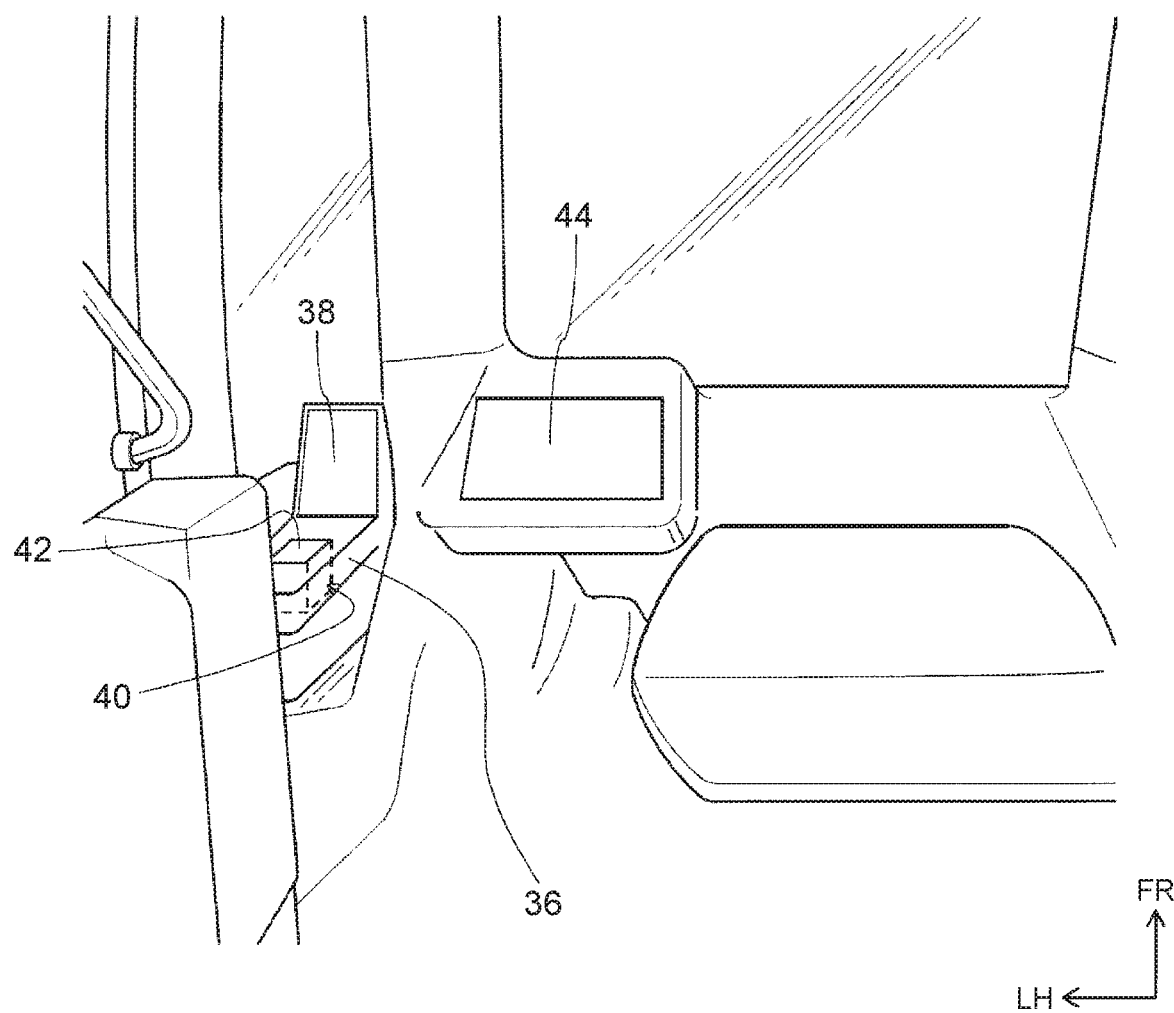
FIG. 3 is a second perspective view showing the inside of the passenger compartment of the autonomous vehicle concerning the embodiment.

FIGS. 2 and 3 are perspective views showing the inside of a passenger compartment of the autonomous vehicle 10. As described above, the autonomous vehicle 10 is used as a bus. The central portion of the passenger compartment is therefore a floor 30 for standing occupants or occupants on wheelchairs. The autonomous vehicle 10 has seats 32 for occupants along the inner side wall of the passenger compartment.

The autonomous vehicle 10 has an operator seat 34 for an operator who performs the drive control of the autonomous vehicle 10, performs the notification to the outside of the vehicle (operates the blinkers, the hazard lights, the horn, etc.), and controls equipment (an air conditioning system, wipers, headlamps, taillamps, etc.) included in the autonomous vehicle 10. FIG. 2 shows a seating portion 34a of the operator seat 34 being lowered with a seat surface 34b facing upward. However, the seating portion 34a can be flipped up. In the present embodiment, the operator seat 34 is provided on the left inner side surface of the passenger compartment near the front side of the door 18. However, the operator seat 34 may be provided on the right inner side surface of the passenger compartment.

An armrest 36 is provided on the front side of the operator seat 34. The armrest 36 is a base member extending in the longitudinal direction of the vehicle for the operator sitting on the operator seat 34 to place his or her arm. In the present embodiment, the operator seat 34 is provided on the left inner side surface of the passenger compartment, as described above. The armrest 36 is therefore disposed on the left inner end of the passenger compartment. When the operator seat 34 is provided on the right inner side surface of the passenger compartment, the armrest 36 is disposed on the right inner end of the passenger compartment. The armrest 36 is located above the seat surface 34b of the operator seat 34 lowered to a sittable position. The base member is not limited to the armrest 36 and may be a base for the operator to place his or her hand.

A touch panel 38 is mounted on the front end of the armrest 36 so as to stand upward from the upper surface of the armrest 36 (see FIG. 3). The touch panel 38 has a display surface (operation surface) facing rearward (that is, facing toward the operator seat 34). This allows the operator sitting on the operator seat 34 to place his or her arm on the armrest 36 and operate the touch panel 38 with his or her hand. The touch panel 38 allows the operator to input a vehicle speed control command, a command to notify the outside of the vehicle, an equipment control command for the equipment included in the autonomous vehicle 10, and a command to change the drive mode, etc. The display screen of the touch panel 38 will be described in detail later.

The armrest 36 is provided with a storage portion 40 capable of storing a mechanical operation unit for inputting a drive control command to the autonomous vehicle 10. The storage portion 40 is covered by a lid 42. That is, the mechanical operation unit is not exposed to the passenger compartment when stored in the storage portion 40. In the present embodiment, the storage portion 40 is provided in the armrest 36. However, the storage portion 40 may be provided in a place other than the armrest 36. The mechanical operation unit may be operable in any drive mode of the autonomous vehicle 10 but is mainly used in the manual drive mode. The mechanical operation unit will be described in detail later.

A display 44 that displays information on the autonomous vehicle 10 is provided in the front left corner of the passenger compartment (see FIG. 3). The display 44 displays, for example, information such as the vehicle speed of the autonomous vehicle 10, the outside air temperature, and the next bus stop.

In the present embodiment, the operation device for the autonomous vehicle 10 includes the touch panel 38 and the mechanical operation unit. The autonomous vehicle 10 is not provided with a foot-operated foot pedal for inputting a vehicle speed control command, such as an accelerator pedal or a brake pedal, which is provided in conventional automobiles etc.

Figure 4:
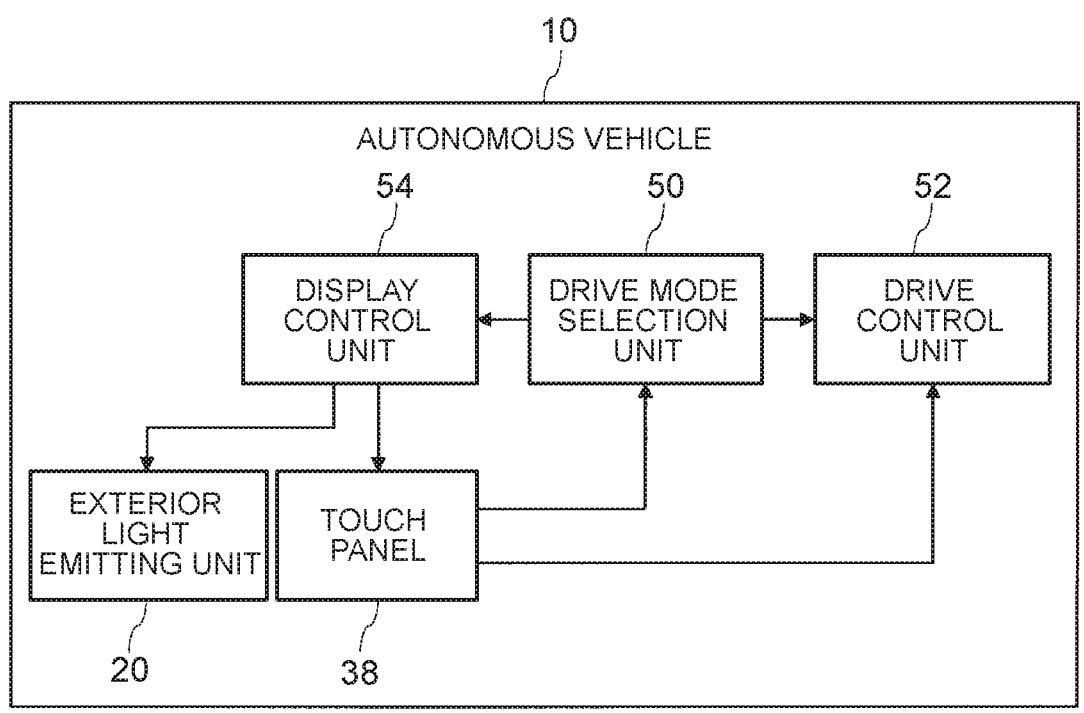
FIG. 4 is a functional block diagram of the autonomous vehicle according to the embodiment.

FIG. 4 is a functional block diagram of the autonomous vehicle 10. The autonomous vehicle 10 includes a drive mode selection unit 50, a drive control unit 52, and a display control unit 54 in addition to the exterior light emitting units 20 and the touch panel 38. The drive mode selection unit 50, the drive control unit 52, and the display control unit 54 are implemented by cooperation of hardware such as a processor and software for operating the hardware.

The drive mode selection unit 50 selects one of the autonomous drive mode, the semi-autonomous drive mode, and the manual drive mode of the autonomous vehicle 10 based on a command to change the drive mode that is input by the operator via the touch panel 38.

According to the drive mode selected by the drive mode selection unit 50, the drive control unit 52 performs the drive control of the autonomous vehicle 10 based on a drive control command received from the touch panel 38 or the mechanical operation unit (not shown in FIG. 4), a drive control command received from the management center, and detection results received from the various sensors mounted on the autonomous vehicle 10.

The display control unit 54 controls the touch panel 38 to display various screens and controls the light emitting state of the exterior light emitting units 20. Various screens of the touch panel 38 will be described below. These screens are all displayed under the control of the display control unit 54.

The display screens of the touch panel 38 will be described with reference to FIGS. 5 to 11B.

Figure 5:
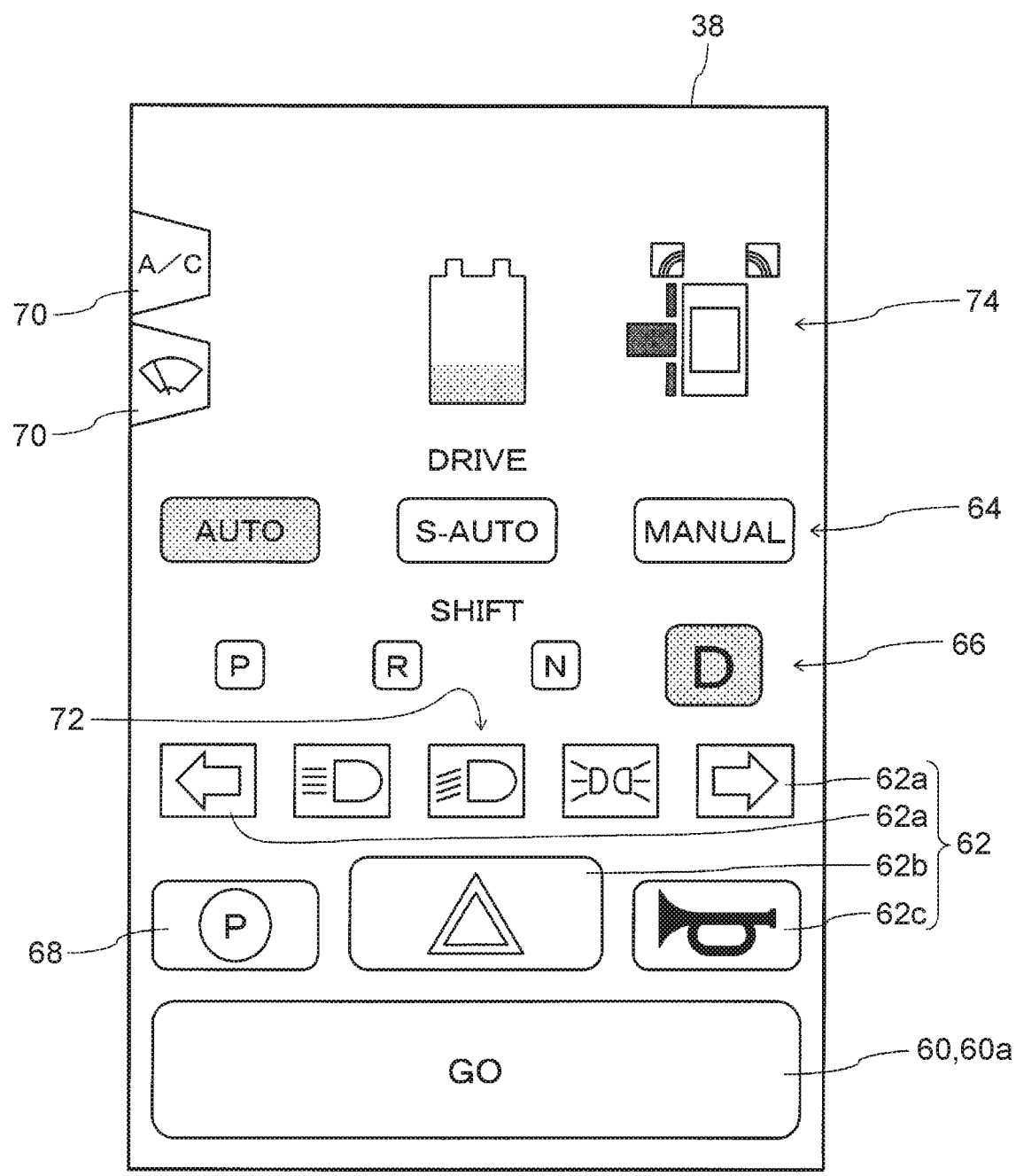
FIG. 5 illustrates a screen that is displayed on a touch panel when the autonomous vehicle is in an autonomous drive mode and is stopped.

FIG. 5 illustrates a display screen that is displayed on the touch panel 38 when the autonomous vehicle 10 is in the autonomous drive mode and is stopped. The display screen of the touch panel 38 in the autonomous drive mode will be described below. However, the display screen of the touch panel 38 is mostly the same in every drive mode. Differences in the display of the touch panel 38 between the drive modes will be described as necessary.

Figure 6:
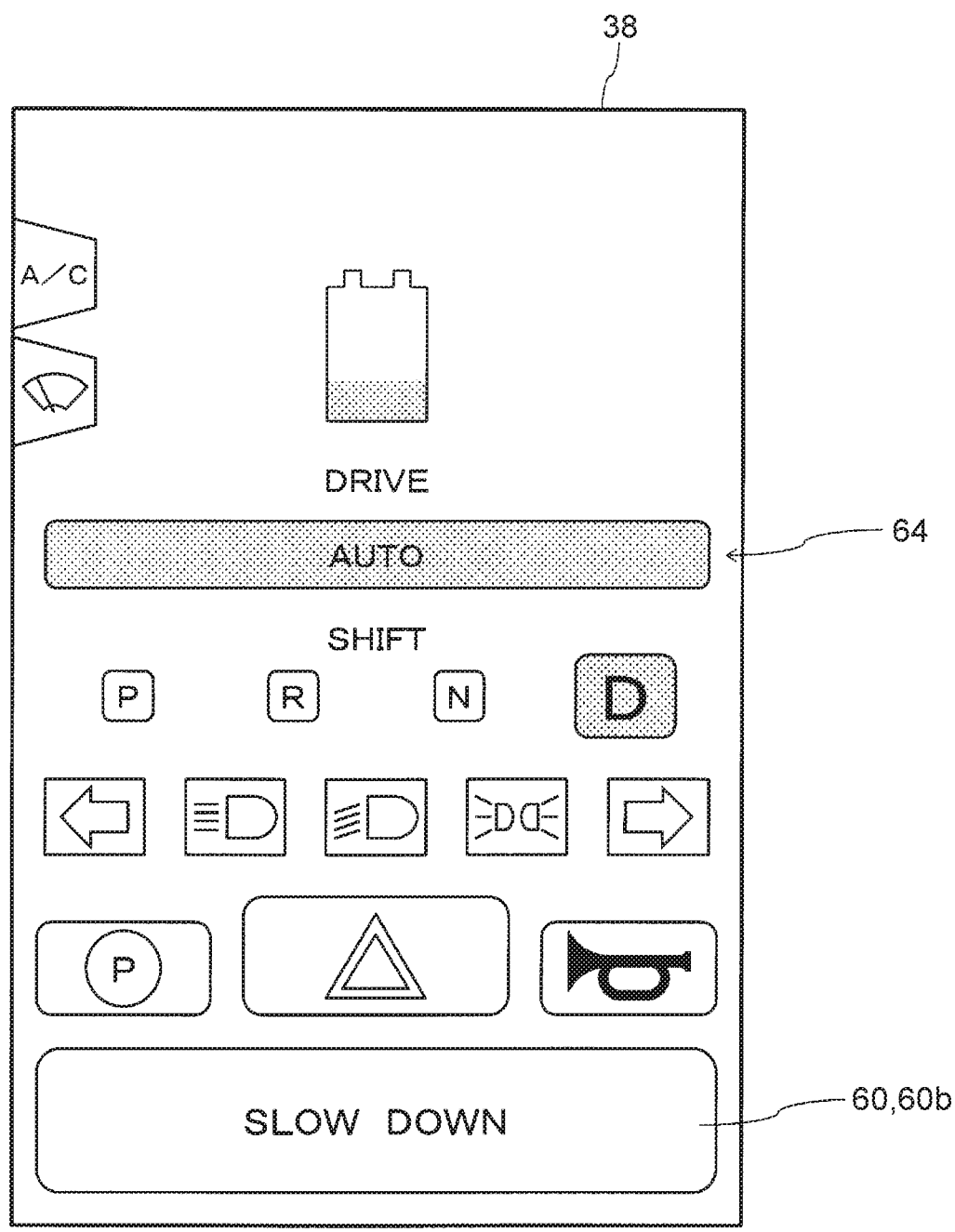
FIG. 6 illustrates a screen that is displayed on the touch panel during autonomous driving.

The touch panel 38 displays a vehicle speed control button 60 for inputting a vehicle speed control command to the autonomous vehicle 10 and notification buttons 62 for inputting a command to notify the outside of the vehicle. In the present embodiment, when the autonomous vehicle 10 is stopped, the touch panel 38 displays a GO button 60a as the vehicle speed control button 60. The GO button 60a is a start button for inputting a start command to the autonomous vehicle 10. When the autonomous vehicle 10 starts driving autonomously, the touch panel 38 displays a SLOWDOWN button 60b instead of the GO button 60a as the vehicle speed control button 60, as shown in FIG. 6. The SLOWDOWN button 60b is a deceleration button for inputting a deceleration command.

The autonomous vehicle 10 can be stopped by continuously operating the SLOWDOWN button 60b. Accordingly, it can be said that the SLOWDOWN button 60b is a button for inputting a stop command to stop the autonomous vehicle 10. In the present embodiment, the touch panel 38 displays, as the notification buttons 62, blinker buttons 62a for inputting a command to turn on and off the blinkers, a hazard button 62b for inputting a command to turn on and off the hazard lights, and a horn button 62c for inputting a command to honk the horn. In the present embodiment, the touch panel 38 displays the plurality of notification buttons 62. However, the touch panel 38 may display a single notification button 62. Alternatively, the touch panel 38 may display other types of notification buttons 62 than the above notification buttons 62.

The vehicle speed control button 60 and the notification buttons 62 are displayed on the same screen. The expression "displayed on the same screen" herein means that both the vehicle speed control button 60 and the notification buttons 62 are operably displayed on the touch panel 38 without the need for the operator to perform a separate operation (e.g., an operation to switch the screen). For example, the expression "displayed on the same screen" refers to the vehicle speed control button 60 and the notification buttons 62 being displayed at the same time. Accordingly, for example, in the case where the screen of the touch panel 38 can be split into a plurality of screens, it can be said that the vehicle speed control button 60 and the notification buttons 62 are displayed on the same screen even when the vehicle speed control button 60 is displayed on one of the screens and the notification buttons 62 are displayed on the other screen, as long as both the vehicle speed control button 60 and the notification buttons 62 are operably displayed without the need for the operator to perform a separate operation.

In the present embodiment, both the vehicle speed control button 60 and the notification buttons 62 are soft buttons displayed on the touch panel 38, and the vehicle speed control button 60 and the notification buttons 62 are displayed on the same screen. Accordingly, the operator can immediately operate both buttons. The operator can thus easily switch between the operation of the vehicle speed control button 60 and the operation of the notification buttons 62. In other words, the operator can switch between the operation of the vehicle speed control button 60 and the operation of the notification buttons 62 without extra labor and time.

The vehicle speed control button 60 and the notification buttons 62 are operated more frequently than the other buttons and may sometimes need to be operated more quickly than the other buttons. Accordingly, either or both of the vehicle speed control button 60 and the notification buttons 62 are desirably displayed on the lower part of the touch panel 38. As described above, the touch panel 38 stands upward from the upper surface of the armrest 36 on which the operator places his or her arm. Accordingly, with the arm on the armrest 36, it is easier and quicker for the operator to operate the lower part of the touch panel 38 than the upper part of the touch panel 38. Displaying either or both of the vehicle speed control button 60 and the notification buttons 62 on the lower part of the touch panel 38 thus allows the operator to more easily or more quickly operate these buttons.

The vehicle speed control button 60 is desirably displayed below the notification buttons 62. The vehicle speed control button 60 is operated more frequently than the notification buttons 62 and often need be operated more quickly than the notification buttons 62. With the arm on the armrest 36, it is easier and quicker for the operator to operate the lower part of the touch panel 38 than the upper part of the touch panel 38. Displaying the vehicle speed control button 60 below the notification buttons 62 thus allows the operator to more easily or more quickly operate the vehicle speed control button 60 than the notification buttons 62.

The vehicle speed control button 60 is desirably displayed larger than the notification buttons 62. As described above, the vehicle speed control button 60 is operated more frequently than the notification buttons 62 and often need be operated more quickly than the notification buttons 62. Displaying the vehicle speed control button 60 larger than the notification buttons 62 thus allows the operator to more easily operate the vehicle speed control button 60 than the notification buttons 62.

Drive mode change buttons 64 for inputting a command to change the drive mode of the autonomous vehicle 10 are displayed on the same screen of the touch panel 38 as the vehicle speed control button 60 and the notification buttons 62. As shown in FIG. 5, when the autonomous vehicle 10 is stopped, an autonomous drive mode button for changing the drive mode to the autonomous drive mode, a semi-autonomous drive mode button for changing the drive mode to the semi-autonomous drive mode, and a manual drive mode button for changing the drive mode to the manual drive mode are displayed as the drive mode change buttons 64. The drive mode change buttons 64 are desirably displayed in such a manner that the operator can see the current drive mode. In the example of FIG. 5, the current drive mode is the autonomous drive mode and therefore the autonomous drive mode button is displayed in a different manner (in a different color in the example of FIG. 5) from the semi-autonomous drive mode button and the manual drive mode button.

Displaying the drive mode change buttons 64 on the same screen as the vehicle speed control button 60 and the notification buttons 62 allows the operator to easily switch even between the operation of the vehicle speed control button 60 or the notification buttons 62 and the operation of the drive mode change buttons 64.

In the present embodiment, the operator is not allowed to change the drive mode while the autonomous vehicle 10 is traveling. Accordingly, as shown in FIG. 6, only the button corresponding to the current drive mode (the autonomous drive mode button in the example of FIG. 6) is displayed as the drive mode change button 64.

Shift change buttons 66 for changing the shift (gear) of the autonomous vehicle 10 are displayed on the same screen of the touch panel 38 as the vehicle speed control button 60 and the notification buttons 62. A plurality of buttons corresponding to parking (P), reverse (R), neutral (N), and drive (D) are displayed as the shift change buttons 66. The shift change buttons 66 are desirably displayed in such a manner that the operator can see the current shift. In the example of FIG. 5, the current shift is D and therefore the button corresponding to the shift D is displayed in a different manner (in a different color in the example of FIG. 5) from the buttons corresponding to the other shifts. In the present embodiment, the operator is not allowed to change the shift in the autonomous drive mode. Accordingly, the shift change buttons 66 may be displayed small or may not be displayed in the autonomous drive mode.

Displaying the shift change buttons 66 on the same screen as the vehicle speed control button 60 and the notification buttons 62 allows the operator to easily switch even between the operation of the vehicle speed control button 60 or the notification buttons 62 and the operation of the shift change buttons 66.

Figure 7:
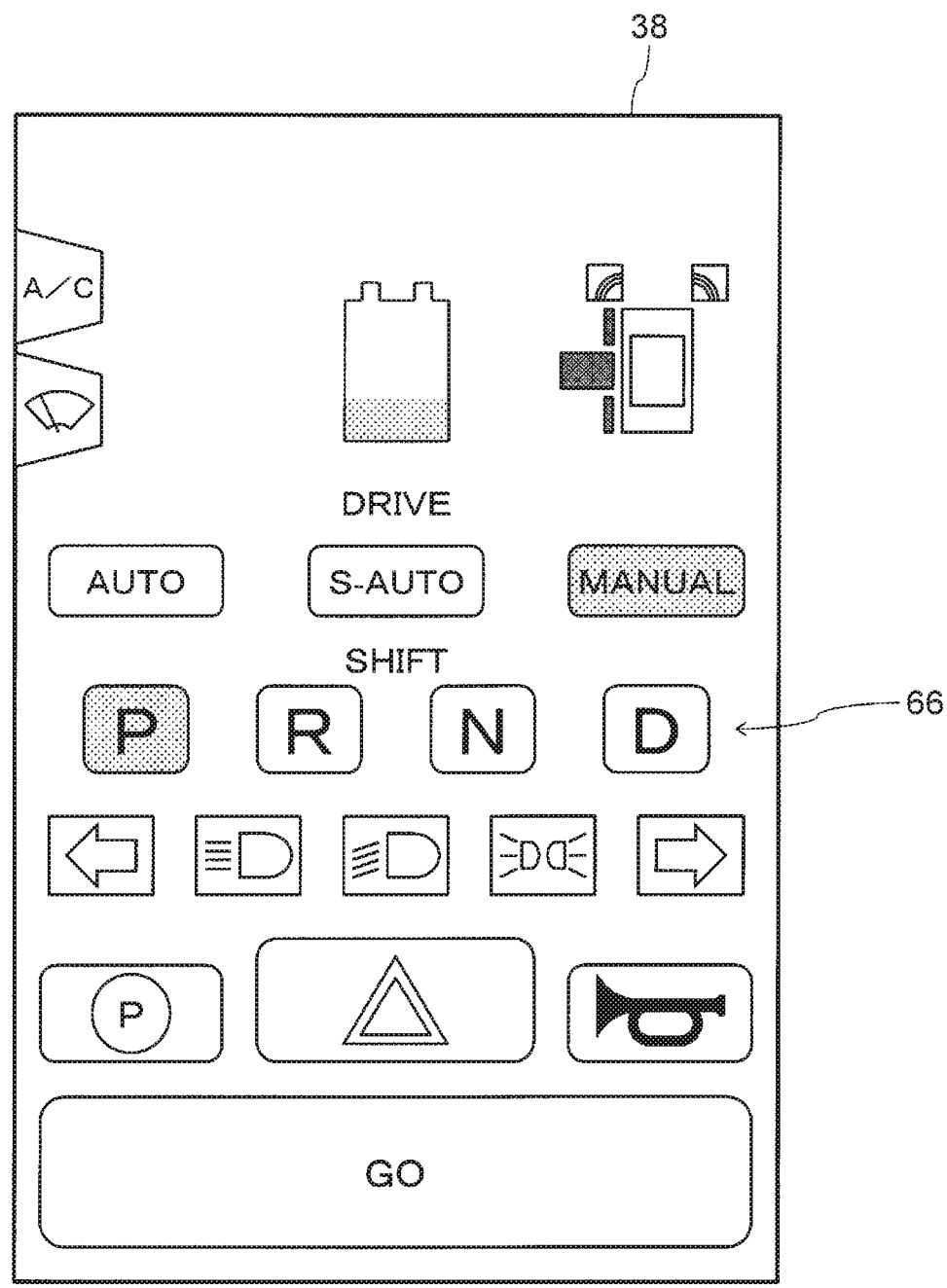
FIG. 7 illustrates a screen that is displayed on the touch panel when the autonomous vehicle is in a manual drive mode.

In the present embodiment, the operator is not allowed to change the shift in the autonomous drive mode. Accordingly, as shown in FIG. 5, only the button corresponding to the current shift, namely the shift D, is displayed large and the buttons corresponding to the other shifts are displayed small in the autonomous drive mode. At this time, the drive control unit 52 (see FIG. 4) will not change the shift of the autonomous vehicle 10 even when the operator operates the shift change buttons 66. In the manual drive mode, the operator is allowed to change the shift using the shift change buttons 66. Accordingly, as shown in FIG. 7, all the buttons corresponding to all the shifts are displayed in the same size in the manual drive mode. At this time, the shift can be changed when the operator operates any of the shift change buttons 66. As described above, the manner in which the shift change buttons 66 are displayed may be changed according to the drive mode of the autonomous vehicle 10.

A P-brake button 68 for inputting a command to engage and disengage an electric parking brake, tub switches 70 for displaying equipment control buttons that control the equipment included in the autonomous vehicle 10, and light buttons 72 for inputting a command to control the headlamps or the taillamps are displayed on the same screen of the touch panel 38 as the vehicle speed control button 60 and the notification buttons 62. This allows the operator to easily switch even between the operation of the vehicle speed control button 60 or the notification buttons 62 and the operation of the P-brake button 68, the tub switches 70, or the light buttons 72.

A state indicator 74 indicating the state of the autonomous vehicle 10 is displayed on the same screen of the touch panel 38 as the vehicle speed control button 60 and the notification buttons 62. In the present embodiment, the state indicator 74 is a diagram showing the state of charge of the autonomous vehicle 10, the open/closed state of the door 18, the state of the ramp, and the detection states of the various sensors mounted on the autonomous vehicle 10. The state indicator 74 is not limited to the diagram but may be displayed in other forms. The state indicator 74 may indicate the states other than the above states. The state indicator 74 is an indicator and is not a button. The state indicator 74 therefore cannot be operated by the operator. As described above, the current drive mode can be shown by the drive mode change button 64, and the current shift can be shown by the shift change button 66. It can therefore be said that the drive mode change buttons 64 and the shift change buttons 66 indicate the state of the autonomous vehicle 10.

Since the state of the autonomous vehicle 10 is displayed on the same screen as the vehicle speed control button 60 and the notification buttons 62 by the state indicator 74 or by the drive mode change buttons 64 and the shift change buttons 66, the operator can operate the vehicle speed control button 60 and the notification buttons 62 as soon as the operator checks the state of the autonomous vehicle 10.

Figure 8:
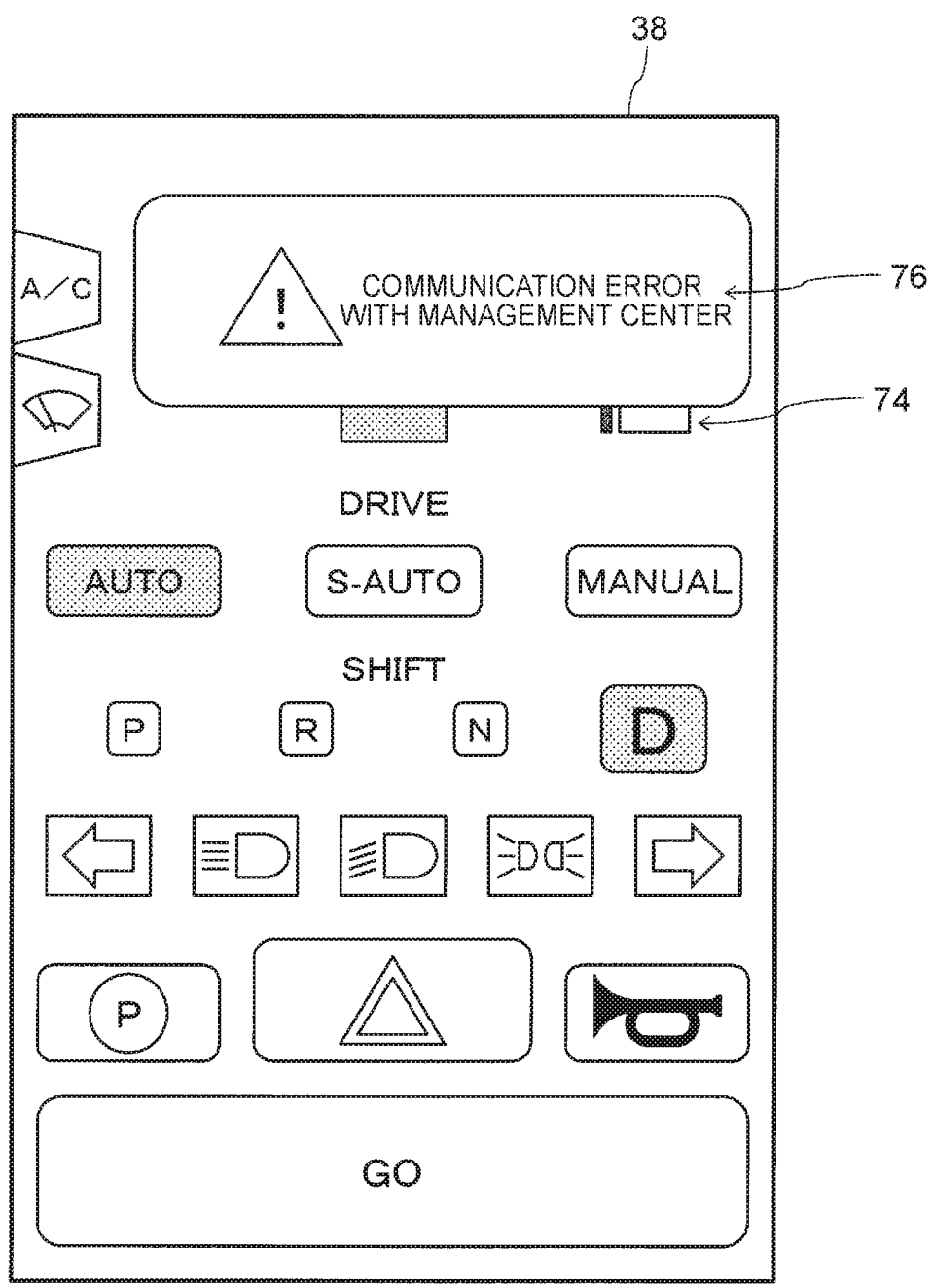
FIG. 8 illustrates a screen of the touch panel with a message displayed thereon.

As shown in FIG. 8, a message 76 for the operator is displayed on the same screen of the touch panel 38 as the vehicle speed control button 60 and the notification buttons 62. The message 76 is not constantly displayed on the touch panel 38 but is temporarily displayed at the timing when it is necessary to notify the operator of information. Since the various buttons and the state indicator 74 are displayed on the display surface of the touch panel 38, the message 76 is displayed superimposed on these buttons and the state indicator 74. The message 76 is desirably displayed superimposed on at least a part of the state indicator 74. This restrains the message 76 from being superimposed on the buttons displayed on the touch panel 38 and thus restrains the buttons from becoming inoperable while the message 76 is being displayed. Especially, the message 76 is desirably displayed so as not to be superimposed on the vehicle speed control button 60 and the notification buttons 62. This allows the operator to operate the vehicle speed control button 60 and the notification buttons 62 even while the message 76 is being displayed.

Figure 9:
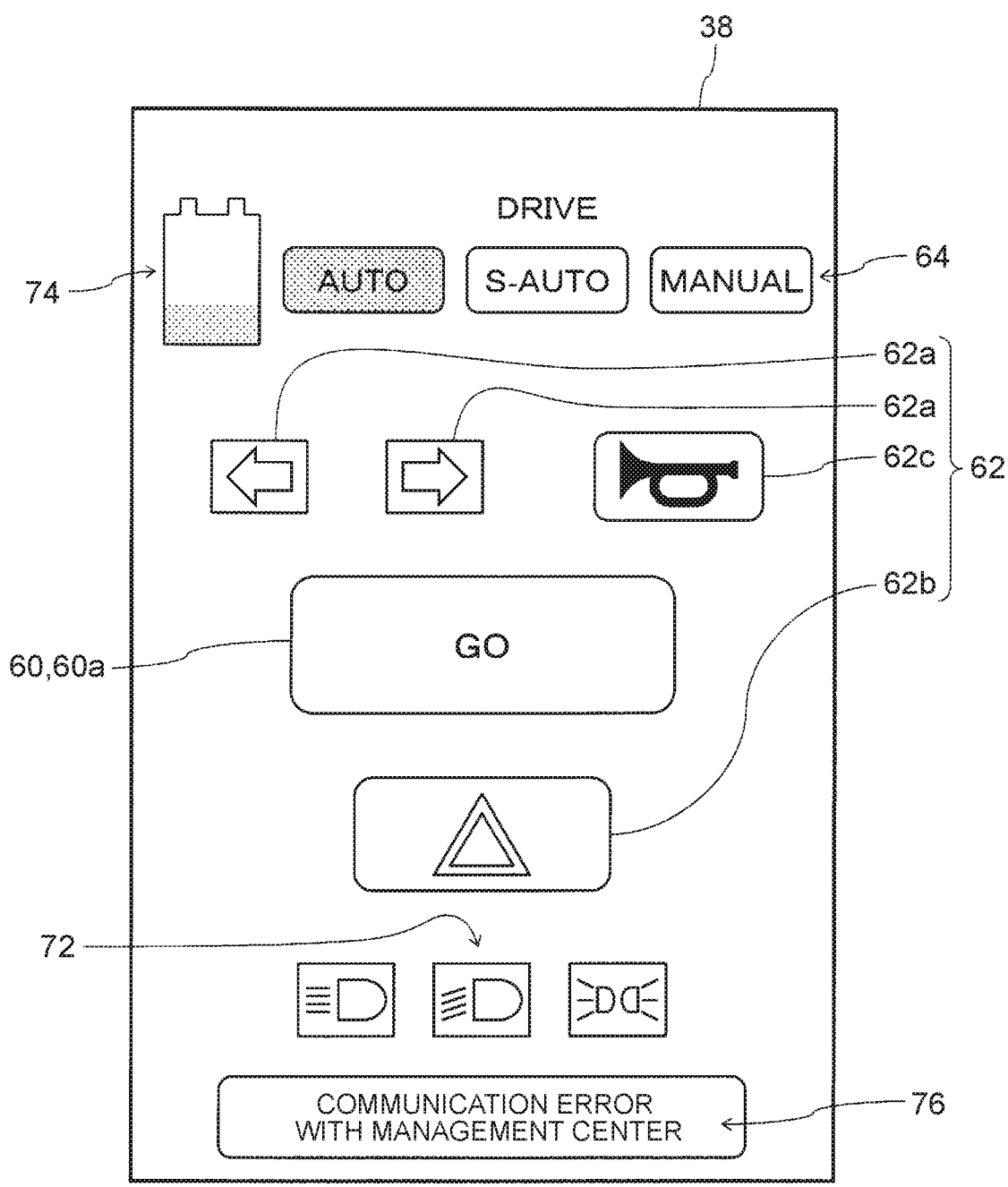
FIG. 9 illustrates a modification example of the screen of the touch panel.

FIG. 9 illustrates a modification example of the screen of the touch panel 38. In the modification example shown in FIG. 9, the vehicle speed control button 60 is displayed in the center of the screen of the touch panel 38, and the notification buttons 62 are displayed near the vehicle speed control button 60. In the example of FIG. 9, the notification buttons 62 are displayed immediately above and immediately below the vehicle speed control button 60. Specifically, the blinker buttons 62*a* and the horn button 62*c* are displayed above the vehicle speed control button 60, and the hazard button 62*b* is displayed below the vehicle speed control button 60. Alternatively, the notification buttons 62 may be displayed immediately to the right or left of the vehicle speed control button 60. In the example of FIG. 9, the drive mode change buttons 64 and the state indicator 74 are displayed above the blinker buttons 62*a* and the horn button 62*c*, and the message 76 is displayed below the hazard button 62*b*. Other buttons may be displayed above the blinker buttons 62*a* and the horn button 62*c* and below the hazard button 62*b*.

Depending on the position of the touch panel 38, the operator may most easily operate the center of the screen of the touch panel 38. Since the vehicle speed control button 60 is operated frequently and may sometimes need to be operated most quickly, displaying the vehicle speed control button 60 in the center of the screen allows the operator to easily operate the vehicle speed control button 60. Displaying the notification buttons 62 near the vehicle speed control button 60 allows the operator to more easily switch between the operation of the vehicle speed control button 60 and the operation of the notification buttons 62.

Figure 10:
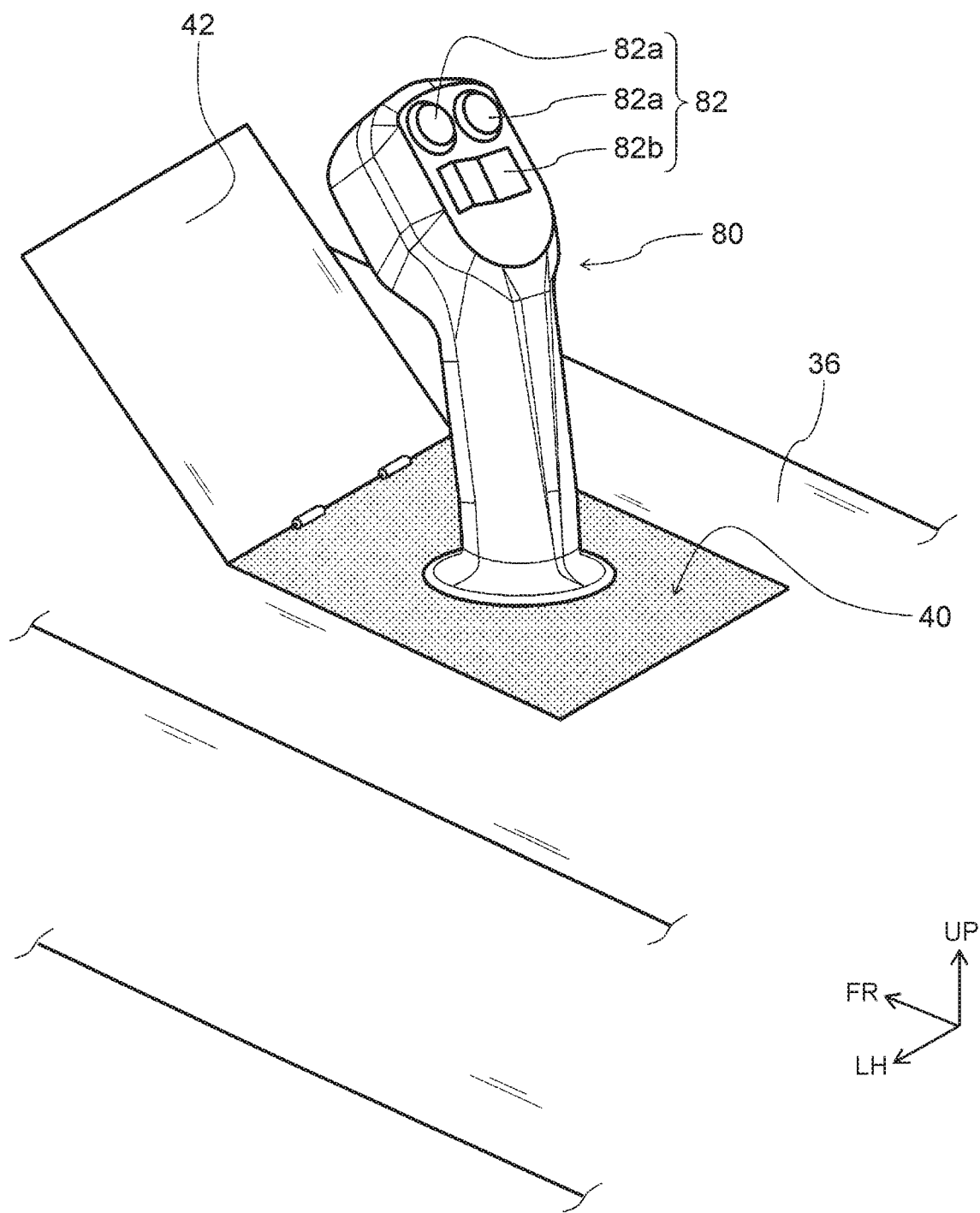
FIG. 10 is a perspective view of a mechanical operation unit.

FIG. 10 shows a mechanical operation unit 80 pulled upward from the storage portion 40 (see FIG. 2) provided in the armrest 36 with the lid 42 being opened. In the present embodiment, the mechanical operation unit 80 is in the shape of a stick extending in the vertical direction. However, the shape of the mechanical operation unit 80 is not limited to this.

The mechanical operation unit 80 can be operated as a lever. That is, the mechanical operation unit 80 can be tilted in the longitudinal and lateral directions of the vehicle with its lower end as a fulcrum. When the mechanical operation unit 80 is tilted forward, an acceleration control command is input to the autonomous vehicle 10. When the mechanical operation unit 80 is tilted rearward, a deceleration control command is input to the autonomous vehicle 10. That is, the vehicle speed control can be performed by tilting the mechanical operation unit 80 in the longitudinal direction of the vehicle. When the mechanical operation unit 80 is tilted to the left, a left turn control command is input to the autonomous vehicle 10. When the mechanical operation unit 80 is tilted to the right, a right turn control command is input to the autonomous vehicle 10.

Notification switches 82 for inputting a command to notify the outside of the vehicle are provided in the upper part of the mechanical operation unit 80. In the present embodiment, blinker switches 82*a* for turning on and off the blinkers and a horn switch 82*b* for inputting a command to honk the horn are provided as the notification switches 82. A hazard switch for turning on and off the hazard lights may be provided in addition to the blinker switches 82*a* and the horn switch 82*b*.

Since the mechanical operation unit 80 for performing the vehicle speed control has the notification switches 82, the operator can easily switch between the operation for the vehicle speed control and the operation for notifying the outside of the vehicle even when the operator performs the drive control of the autonomous vehicle 10 using the mechanical operation unit 80 such as when the autonomous vehicle 10 is in the manual drive mode or the touch panel 38 is out of order.

Figure 11A:
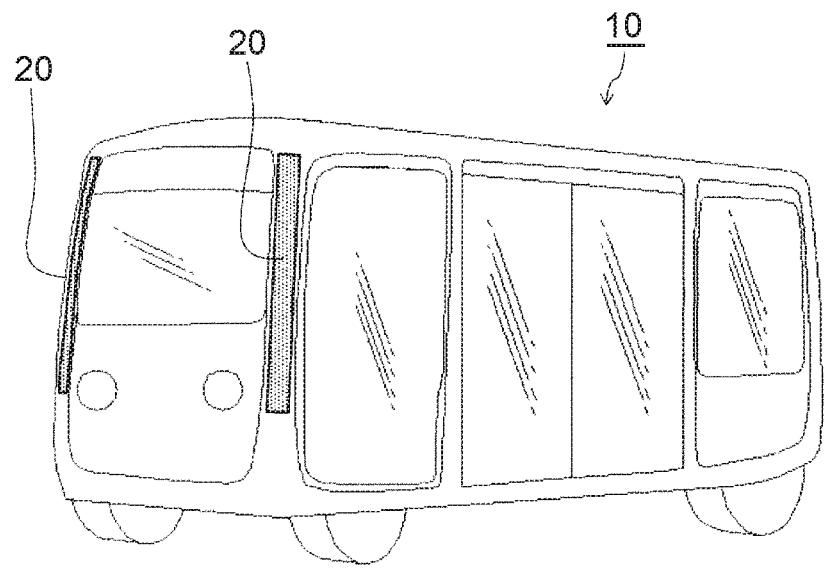
FIG. 11A illustrates exterior light emitting units emitting light.

FIG. 11A illustrates the autonomous vehicle 10 with the exterior light emitting units 20 emitting light. The display control unit 54 (see FIG. 4) causes the exterior light emitting units 20 to emit light in a color corresponding to the drive mode selected by the drive mode selection unit 50. For example, the display control unit 54 causes the exterior light emitting units 20 to emit blue light when in the autonomous drive mode, causes the exterior light emitting units 20 to emit green light when in the semi-autonomous drive mode, and causes the exterior light emitting units 20 to emit red light when in the manual drive mode.

Figure 11B:
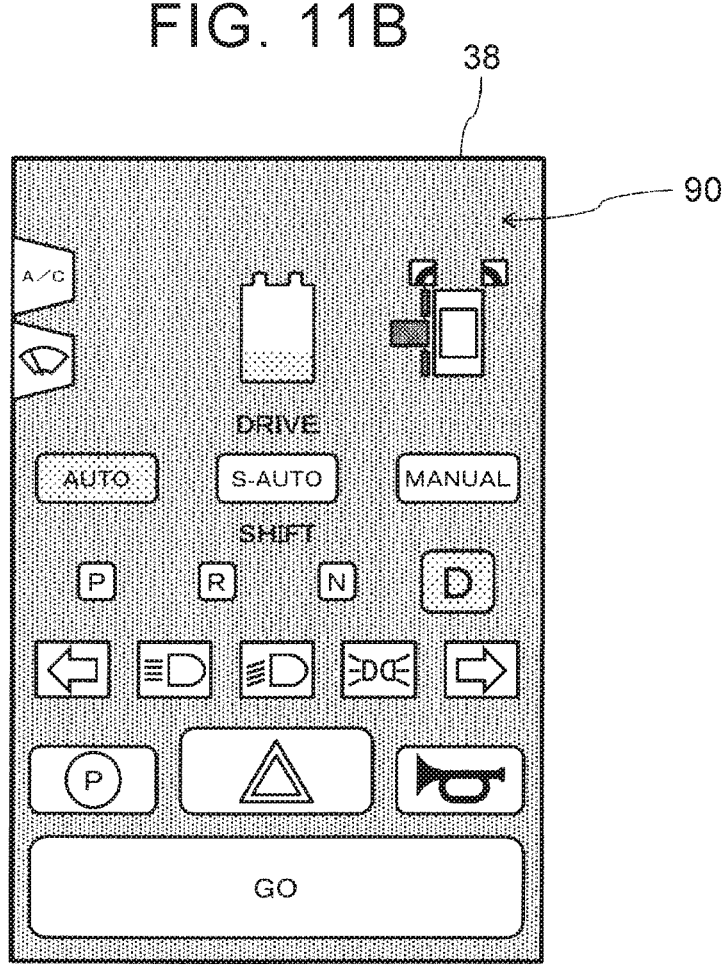
FIG. 11B illustrates the background of the touch panel being displayed in the same color as the light of the exterior light emitting units.

As shown in FIG. 11B, the display control unit 54 displays a background 90 of the touch panel 38 in the same color as, or a similar color to, the light of the exterior light emitting units 20. That is, the background 90 of the touch panel 38 is also displayed in a color corresponding to the drive mode selected by the drive mode selection unit 50.

Since the display control unit 54 causes the exterior light emitting units 20 to emit light in a color corresponding to the drive mode and displays the background 90 of the touch panel 38 in the same color as, or a similar color to, the light of the exterior light emitting units 20, the operator or passengers can see the current drive mode from both the inside and outside of the autonomous vehicle 10 by the color.

Although the embodiment of the operation device for the autonomous vehicle according to the present disclosure is described above, the operation device for the autonomous vehicle according to the present disclosure is not limited to the above embodiment, and various modifications can be made without departing from the spirit and scope of the disclosure.

What is claimed is:

1. An operation device for an autonomous vehicle, comprising a touch panel configured to display at least one of a start button and a deceleration button, a notification button, and a message for an operator who operates the touch panel on the same screen, the autonomous vehicle being capable of driving autonomously, the start button being a button for starting driving of the autonomous vehicle in an autonomous drive mode, the deceleration button being a button for decelerating the autonomous vehicle during the autonomous drive mode, the notification button being a button for performing notification to an outside of the autonomous vehicle, the message for the operator being temporarily displayed at a timing when it is necessary to notify the operator of information, and the message for the operator being displayed so as not to be superimposed on the start button and the deceleration button
   wherein the autonomous vehicle has a plurality of drive modes including the autonomous drive mode and a manual drive mode, the operation device for the autonomous vehicle further comprising:
   an exterior light emitting member provided on the outside of the vehicle; and
   a processor configured to cause the exterior light emitting member to emit light in a color corresponding to the drive mode and configured to display a background of the touch panel in the same color as the light of the exterior light emitting member.

2. The operation device for the autonomous vehicle according to claim 1, wherein the touch panel stands upward from an upper surface of a base member on which an operator who operates the touch panel places an arm or a hand of the operator, and at least one of the start button, the deceleration button, and the notification button is displayed on a lower part of the touch panel.

3. The operation device for the autonomous vehicle according to claim 2, wherein at least one of the start button and the deceleration button is displayed below the notification button.

4. The operation device for the autonomous vehicle according to claim 1, wherein at least one of the start button and the deceleration button is displayed in a center of a screen of the touch panel, and the notification button is displayed adjacent to at least one of the start button and the deceleration button.

5. The operation device for the autonomous vehicle according to claim 1, wherein at least one of the start button and the deceleration button is displayed larger than the notification button.

6. The operation device for the autonomous vehicle according to claim 1, wherein:
the touch panel is further configured to display a drive mode change button on the same screen, the drive mode change button being a button for changing the drive mode of the autonomous vehicle.

7. The operation device for the autonomous vehicle according to claim 1, wherein the touch panel is further configured to display a state of the autonomous vehicle on the same screen.

8. The operation device for the autonomous vehicle according to claim 7, wherein:
the touch panel is further configured to display a shift change button on the same screen, the shift change button being a button for changing a shift of the autonomous vehicle, and a manner in which the shift change button is displayed is changed according to the drive mode of the autonomous vehicle.

9. The operation device for the autonomous vehicle according to claim 1, wherein at least one of the start button and the deceleration button or the notification button is operable with the message being displayed.

10. The operation device for the autonomous vehicle according to claim 1, further comprising a lever configured to perform vehicle speed control of the autonomous vehicle, the lever member having a notification switch for performing the notification to the outside of the autonomous vehicle.

\* \* \* \* \*